(12) United States Patent
Irisawa et al.

(10) Patent No.: US 7,981,320 B2
(45) Date of Patent: *Jul. 19, 2011

(54) POLYMERIZABLE COMPOSITION

(75) Inventors: Masatomi Irisawa, Saitama (JP); Ken Matsumoto, Saitama (JP)

(73) Assignee: Adeka Corporation, Tokyo (JP)

( * ) Notice: Subject to any disclaimer, the term of this patent is extended or adjusted under 35 U.S.C. 154(b) by 18 days.

This patent is subject to a terminal disclaimer.

(21) Appl. No.: 12/307,828

(22) PCT Filed: Mar. 14, 2007

(86) PCT No.: PCT/JP2007/055075
§ 371 (c)(1),
(2), (4) Date: Jan. 7, 2009

(87) PCT Pub. No.: WO2008/007479
PCT Pub. Date: Jan. 17, 2008

(65) Prior Publication Data
US 2009/0294730 A1 Dec. 3, 2009

(30) Foreign Application Priority Data

Jul. 10, 2006 (JP) ................. 2006-189772

(51) Int. Cl.
C09K 19/00 (2006.01)
C09K 19/06 (2006.01)
C09K 19/52 (2006.01)
G02F 1/03 (2006.01)
G02F 1/13 (2006.01)

(52) U.S. Cl. ............ 252/299.6; 252/299.01; 252/299.62; 252/299.63; 252/299.64; 252/299.65; 252/299.66; 430/20; 428/1.1

(58) Field of Classification Search ............. 252/299.01, 252/299.1, 299.6–6; 430/20, 270.1; 428/1.1; 560/80, 95, 100; 526/319–320, 323, 326; 525/8, 81, 85, 94, 222
See application file for complete search history.

(56) References Cited

U.S. PATENT DOCUMENTS

| | | | |
|---|---|---|---|
| 5,833,880 A | 11/1998 | Siemensmeyer et al. | |
| 6,417,902 B1 | 7/2002 | Greenfield et al. | |
| 7,683,203 B2 | 3/2010 | Irisawa et al. | |
| 7,771,616 B2 * | 8/2010 | Irisawa et al. ............ | 252/299.62 |

FOREIGN PATENT DOCUMENTS

| | | |
|---|---|---|
| EP | 1 593 991 | 11/2005 |
| JP | 8-3111 A | 1/1996 |
| JP | 10-87565 A | 4/1998 |
| JP | 11-130729 A | 5/1999 |
| JP | 11-513360 | 11/1999 |
| JP | 2005-263789 | 9/2005 |
| JP | 2005-309255 A | 11/2005 |
| WO | WO 2006049111 A1 | 5/2006 |

OTHER PUBLICATIONS

European Patent Office issued an European Search Report dated Oct. 30, 2009, Application No. 07738545.8.
Chinese Office Action mailed Aug. 11, 2010 issued in the Chinese counterpart application.

* cited by examiner

*Primary Examiner* — Geraldina Visconti
(74) *Attorney, Agent, or Firm* — Young & Thompson

(57) ABSTRACT

A polymerizable composition comprising a bifunctional (meth)acrylate compound represented by the following general formula (1) and a monofunctional (meth)acrylate compound represented by the general formula (2):

[Formula 1]

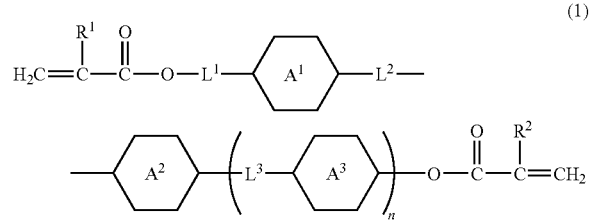

(1)

$R^1$ and $R^2$ each=a hydrogen atom, methyl group, or halogen atom; $A^1$, $A^2$, $A^3$ each=a benzene, cyclohexane, cyclohexene, naphthalene, decahydronaphthalene, tetrahydronaphthalene, or phenanthrene ring; rings may be substituted with 1-8 carbon atom alkyl group, 1-8 carbon atom alkoxy group, a halogen atom, or a cyano group; at least one of $A^1$, $A^2$, and $A^3$ comprises a substituent; —CH= may be replaced by —N=, and —CH$_2$— may be replaced by —S— or —O—: $L^1$, $L^2$, $L^3$ each=a single bond, —COO—, —OCO—, —(CH$_2$)$_p$—, —CH=CH—, —(CH$_2$)$_q$O—, —CH=CHCH$_2$O—, —CH=C—, —(CH$_2$)$_2$COO—, or —CF=CF—; n=integer 0-3; and, when n≧2, $L^3$ and $A^3$ may be the same or different; p and q each=an integer 1-8:

[Formula 2]

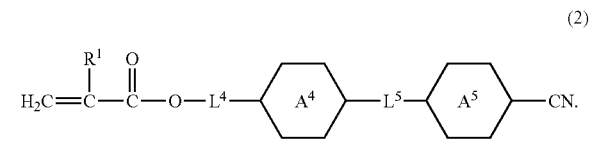

(2)

20 Claims, No Drawings

POLYMERIZABLE COMPOSITION

TECHNICAL FIELD

The present invention relates to a polymerizable composition comprising a specific bifunctional (meth)acrylate compound and a specific monofunctional (meth)acrylate compound. In particular, the present invention relates to a polymerizable composition which provides a polymerized film with a uniform film state and excellent optical properties when the (meth)acryl group is photo-polymerized into a cured film.

BACKGROUND ART

Liquid crystal materials are investigated not only for applications in display media such as display panels represented by a TN type and a STN type, using reversibility of molecular motions of liquid crystals, but also for applications in optical anisotropic materials such as a retardation plate, a polarizing plate, a light polarizing prism, various light filters, and the like, by use of properties of liquid crystals such as molecular orientation and anisotropy in physical properties such as refractive index, dielectric constant, magnetic susceptibility, and the like.

The optical anisotropic material is obtained, for example, by a process where a liquid crystal compound with a polymerizable functional group or a composition containing the compound is first uniformly oriented in a liquid crystal state. Thereafter, the compound or composition is photopolymerized, while retaining the liquid crystal state, by irradiating with an energy ray such as ultraviolet light and the like to obtain a polymerized film with the uniform orientation state semi-permanently fixed.

In a composition used for this polymerized film, when the temperature of exhibition of the liquid crystal phase is high, unintended thermal polymerization may be induced in addition to the photopolymerization induced by energy rays. Thus, uniform orientation of the liquid crystal molecules may be lost and it becomes difficult to fix the desired molecular orientation. Accordingly, in order to make control of the temperature easier during curing, a polymerizable composition which shows a liquid crystal phase at around room temperature is required.

Further, the polymerized film is obtained by coating the polymerizable composition on a substrate and polymerizing the composition. However, when a nonpolymerizable compound is contained therein, there arise such drawbacks that strength of the polymerized film obtained is insufficient and that strain remains inside the film. In addition, when the nonpolymerizable compound is removed therefrom by a solvent and the like, a problem arises that uniformity of the film cannot be maintained and surface irregularity is generated. Therefore, in order to obtain a polymerized film of uniform thickness, a process of coating a solution of the polymerizable composition in a solvent is preferably employed. The liquid crystal compound or the composition containing the same is thus required to have good solubility in solvents.

As a composition used for the polymerized film, for example, Patent Document 1 reports an optical anisotropic material using a nematic composition. However, even though the film is uniform immediately after curing, the nematic composition described in Patent Document 1 has problems that it lacks thermal resistance and solvent resistance, and that the film deforms and optical properties deteriorate with passage of time.

In Patent Documents 2 to 5, the present inventors have reported compositions which show excellent performance such as thermal resistance, solvent resistance, solubility in solvents, a high glass transition temperature, an exhibition of a liquid crystal phase at low temperature, and the like.

Generally, when the polymerized film is thick, there are problems that orientation control of the liquid crystal molecules contained in the polymerizable composition is difficult, light transmittance deteriorates, and discoloration appears. On the other hand, when a thin polymerized film is prepared, even though excellent orientation control is obtained all over the film, the film thickness becomes difficult to control resulting in a non-uniform surface and, also, crystallization of the film becomes easy to occur. Thus, heretofore known compositions have been unsatisfactory in terms of physical properties and optical characteristics of the thinned polymerized film.

Patent Document 1: Japanese Patent Laid-Open Publication No. H8-3111
Patent Document 2: Japanese Patent Laid-Open Publication No. H10-87565
Patent Document 3: Japanese Patent Laid-Open Publication No. H11-130729
Patent Document 4: Japanese Patent Laid-Open Publication No. 2005-263789
Patent Document 5: Japanese Patent Laid-Open Publication No. 2005-309255

DISCLOSURE OF THE INVENTION

Problems to be Solved by the Invention

Accordingly, an object of the present invention is to provide a polymerizable composition which shows a liquid crystal phase at around room temperature and has excellent solubility in solvents, the polymerized film obtained by curing such a composition maintaining a uniform film state even when the polymerized film is made thinner and having excellent thermal resistance, molecular orientation control, and optical characteristics.

Means for Solving the Problems

The present inventors conducted diligent research and, as a result, accomplished the object by providing a polymerizable composition which comprises a bifunctional (meth)acrylate compound represented by the following general formula (1) and a monofunctional (meth)acrylate compound represented by the general formula (2):

[Formula 1]

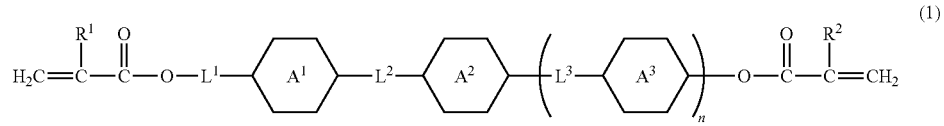

wherein $R^1$ and $R^2$ each independently represent a hydrogen atom, a methyl group, or a halogen atom; rings $A^1$, $A^2$, and $A^3$ each independently represent a benzene ring, a cyclohexane ring, a cyclohexene ring, a naphthalene ring, a decahydronaphthalene ring, a tetrahydronaphthalene ring, or a phenanthrene ring; these rings may be substituted with an alkyl group having 1 to 8 carbon atoms, an alkoxy group having 1 to 8 carbon atoms, a halogen atom, or a cyano group; al least one of the rings $A^1$, $A^2$, and $A^3$ comprises a substituent; —CH= in these rings may be replaced by —N=, and —CH$_2$— in these rings may be replaced by —S— or —O—: $L^1$, $L^2$, and $L^3$ each independently represent a single bond, —COO—, —OCO—, —(CH$_2$)$_p$—, —CH=CH—, —(CH$_2$)$_q$O—, —CH=CHCH$_2$O—, —C≡C—, —(CH$_2$)$_2$COO—, or —CF=CF—; n represents an integer from 0 to 3; and, when n is 2 or larger, $L^3$ and $A^3$ may be the same or different; p and q each independently represent an integer from 1 to 8:

[Formula 2]

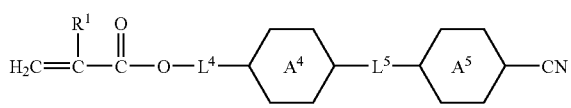

(2)

wherein $R^1$ represents a hydrogen atom, a methyl group, or a halogen atom; rings $A^4$ and $A^5$ each independently represent a benzene ring, a cyclohexane ring, a cyclohexene ring, a naphthalene ring, a decahydronaphthalene ring, a tetrahydronaphthalene ring, or an anthracene ring; these rings may be substituted with an alkyl group having 1 to 8 carbon atoms, an alkoxy group having 1 to 8 carbon atoms, a halogen atom, or a cyano group; —CH= in these rings may be replaced by —N=, and —CH$_2$— in these rings may be replaced by —S— or —O—; $L^4$ and $L^5$ each independently represent a single bond, —COO—, —(CH$_2$)$_p$—, —CH=CH—, —(CH$_2$)$_q$O—, —CH=CHCH$_2$O—, —C≡C—, —(CH$_2$)$_2$COO—, or —CF=CF—; p and q each independently represent an integer from 1 to 8.

In addition, the present invention provides a polymerizable composition, in which the proportion (mass ratio) of a monofunctional (meth)acrylate represented by the general formula (2) to a bifunctional (meth)acrylate represented by the general formula (1) is in a range of 20/80 to 95/5.

Further, the present invention provides a polymerizable composition which exhibits a liquid crystal phase at temperatures of 30° C. or lower.

Furthermore, the present invention provides a polymerizable composition further comprising an optically active compound and exhibiting a cholesteric phase.

Moreover, the present invention provides a composition further comprising a radical polymerization initiator and a surface active agent.

In addition, the present invention provides a polymerized film produced by photopolymerizing the polymerizable composition in a liquid crystal phase thereof.

Further, the present invention provides an optical film for displays comprising using the polymerized film.

BEST MODE FOR CARRYING OUT THE INVENTION

Hereinafter, the polymerizable composition of the present invention and the polymerized film of the invention produced by photopolymerizing the composition will be described in detail with reference to preferable embodiments.

In the general formulae (1) and (2), the halogen atom represented by $R^1$ and $R^2$, and which may substitute rings $A^1$, $A^2$, $A^3$, $A^4$, and $A^5$ includes a fluorine or chlorine atom; the alkyl group having 1 to 8 carbon atoms which may substitute the rings $A^1$, $A^2$, $A^3$, $A^4$, and $A^5$ includes, for example, methyl, chloromethyl, trifluoromethyl, cyanomethyl, ethyl, dichloroethyl, propyl, isopropyl, butyl, sec-butyl, tert-butyl, isobutyl, amyl, isoamyl, tert-amyl, hexyl, 2-hexyl, 3-hexyl, cyclohexyl, 1-methylcyclohexyl, heptyl, 2-heptyl, 3-heptyl, isoheptyl, tert-heptyl, n-octyl, isooctyl, tert-octyl, 2-ethylhexyl, or the like; the alkoxy group having 1 to 8 carbon atoms which may substitute rings $A^1$, $A^2$, $A^3$, $A^4$, and $A^5$ includes, for example, methyloxy, chloromethyloxy, trifluoromethyloxy, cyanomethyloxy, ethyloxy, dichloroethyloxy, propyloxy, isopropyloxy, butyloxy, sec-butyloxy, tert-butyloxy, isobutyloxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, 2-ethylhexyloxy, or the like.

The bifunctional (meth)acrylate compound represented by the general formula (1) includes preferably a compound represented by the following general formula (3). Also preferable is a compound represented by the general formula (1), in which at least one of the rings, $A^1$, $A^2$, and $A^3$ is a naphthalene ring:

[Formula 3]

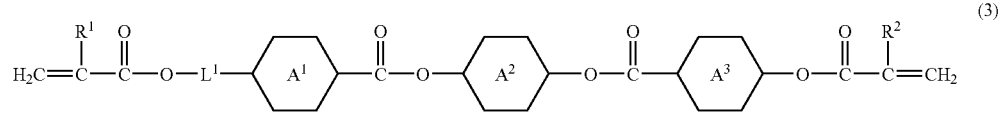

(3)

wherein $R^1$, $R^2$, rings $A^1$, $A^2$, and $A^3$, and $L^1$ are the same as those defined in the general formula (1).

Specific examples of the bifunctional (meth)acrylate compound represented by the general formula (1) include the following compound Nos. 1 to 11. However, the present invention is not limited by the following compounds:

[Formula 4]
Compound No. 1
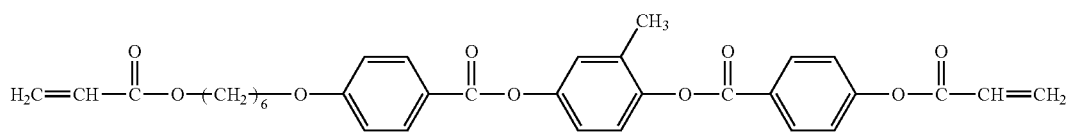
[Formula 5]
Compound No. 2
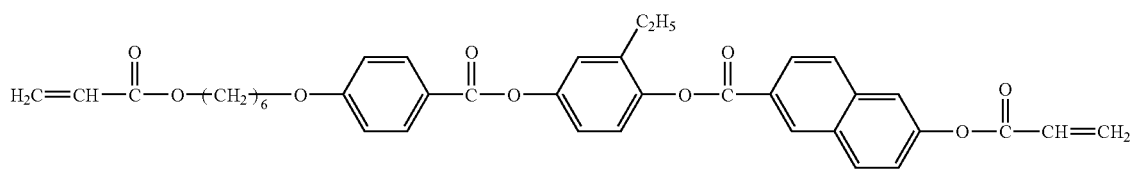
[Formula 6]
Compound No. 3
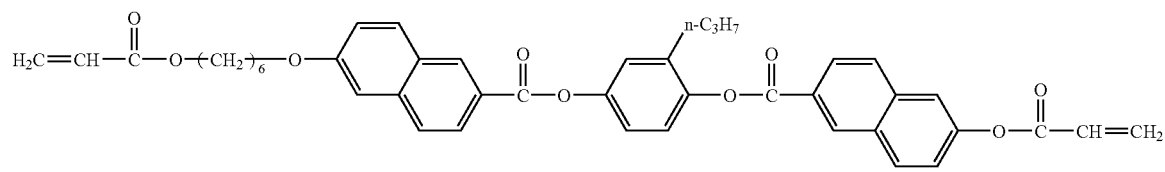
[Formula 7]
Compound No. 4
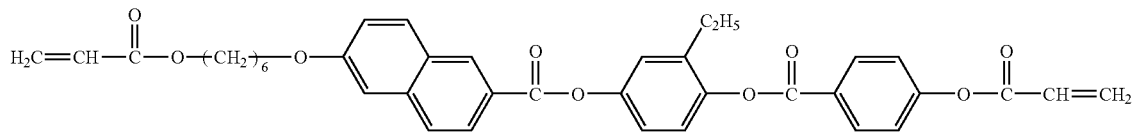
[Formula 8]
Compound No. 5
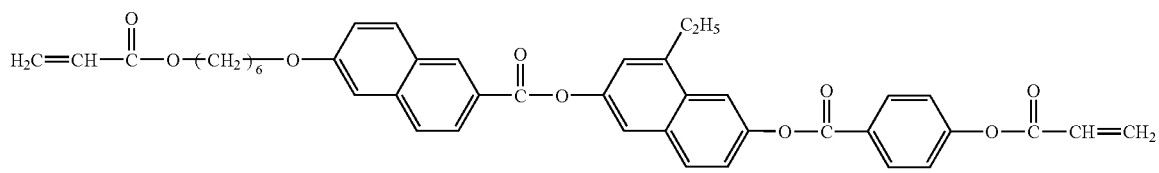
[Formula 9]
Compound No. 6
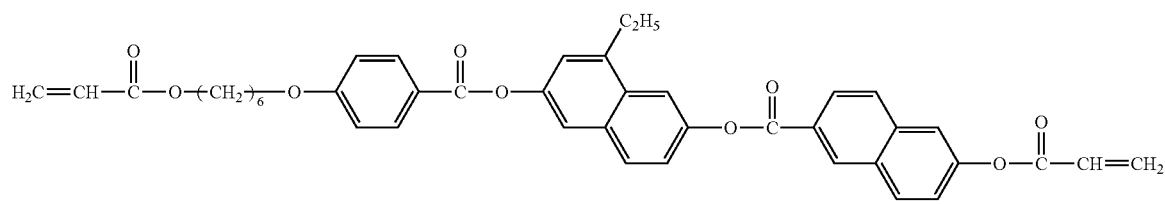
[Formula 10]
Compound No. 7
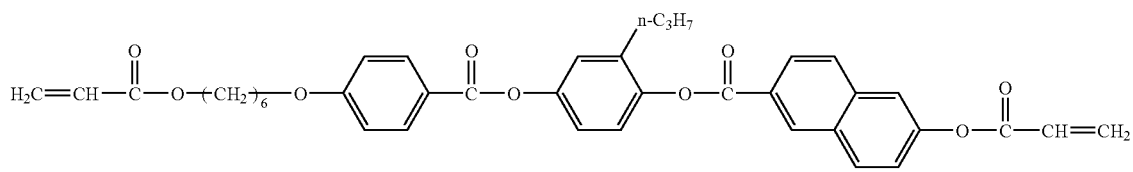

[Formula 11]

Compound No. 8

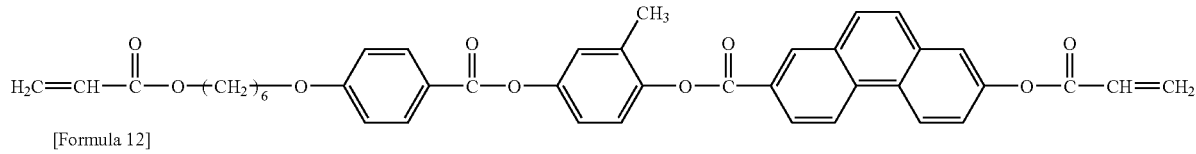

[Formula 12]

Compound No. 9

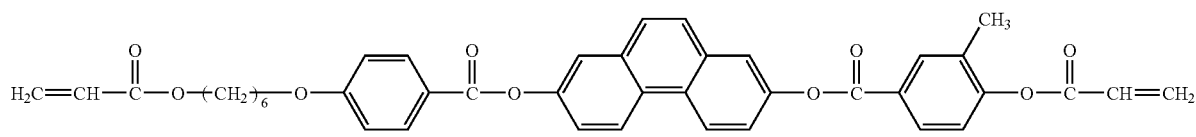

[Formula 13]

Compound No. 10

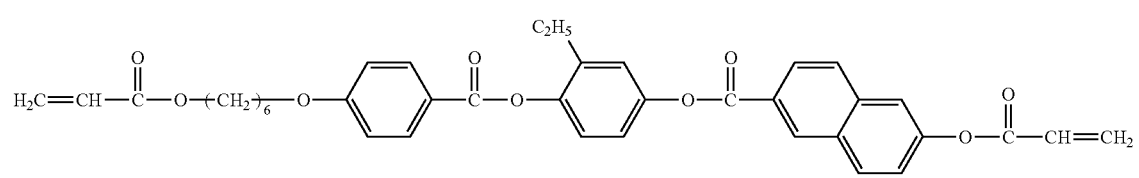

[Formula 14]

Compound No. 11

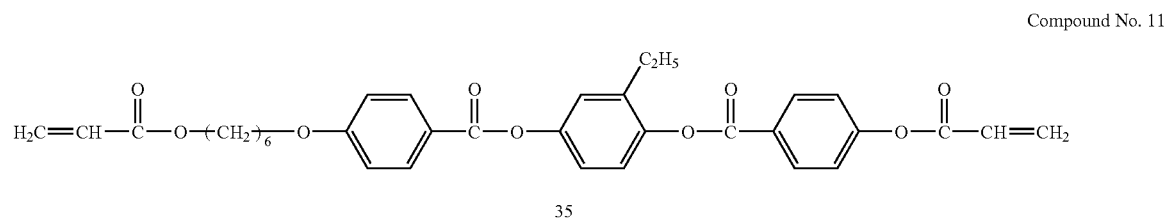

The monofunctional (meth)acrylate compound represented by the general formula (2) preferably includes a compound represented by the following general formula (4):

[Formula 15]

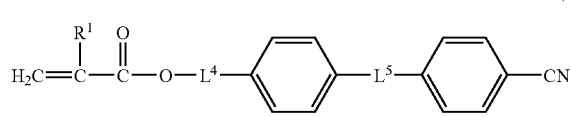

(4)

wherein $R^1$, $L^4$, and $L^5$ are the same as those defined in the general formula (2).

Specific examples of the monofunctional (meth)acrylate compound represented by the general formula (2) include the following compounds a to g. However, the present invention is not limited by the following compounds:

[Formula 16]

Compound a

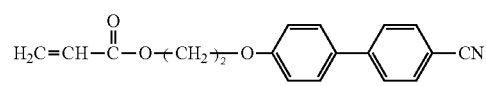

[Formula 17]

Compound b

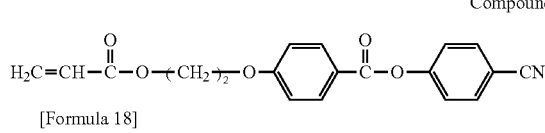

[Formula 18]

Compound c

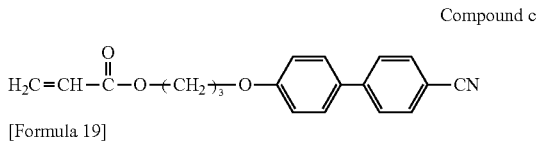

[Formula 19]

Compound d

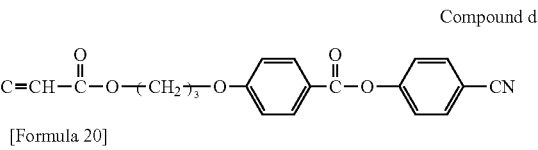

[Formula 20]

Compound e

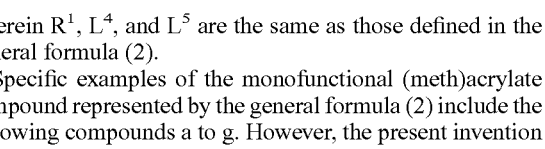

[Formula 21]

Compound f

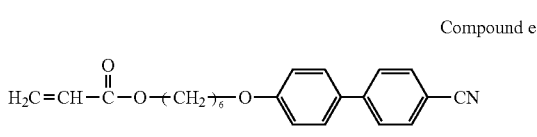

[Formula 22]

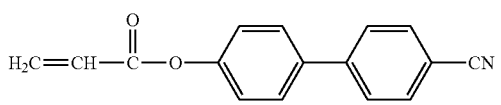

Compound g

The preferable proportion (mass ratio) of the monofunctional (meth)acrylate represented by the general formula (2) to the bifunctional (meth)acrylate represented by the general formula (1) is in a range of 20/80 to 95/5, especially preferably 50/50 to 85/15.

When the proportion is smaller than 20/80, the polymerized film obtained by polymerization thereof sometimes lacks thermal resistance and solvent resistance. When proportion is larger than 95/5, control of the molecular orientation in the polymerizable composition becomes difficult.

In addition, the total content of the bifunctional (meth) acrylate compound and the monofunctional (meth)acrylate is at least preferably 50% by mass or more, especially preferably 70% by mass or more of the polymerizable composition of the present invention (except the solvent, however).

Further, the polymerizable composition of the present invention preferably exhibits a liquid crystal phase at least at around room temperature, specifically 30° C. or lower, more preferably 25° C. or lower, especially.

Moreover, the polymerizable composition of the present invention may be made into a solution by dissolving in a solvent the monomers, namely above-mentioned bifunctional (meth)acrylate and monofunctional (meth)acrylate, and other monomers (compounds with ethylenic unsaturated bonds) used as necessary, together with a radical polymerization initiator.

The above-mentioned other monomer includes, for example, (meth)acrylate esters such as methyl(meth)acrylate, ethyl(meth)acrylate, propyl(meth)acrylate, butyl(meth)acrylate, sec-butyl(meth)acrylate, tert-butyl(meth)acrylate, hexyl (meth)acrylate, 2-ethylhexyl(meth)acrylate, tetrahydrofurfuryl(meth)acrylate, glycidyl(meth)acrylate, allyl(meth) acrylate, allyloxy(meth)acrylate, cyclohexyl(meth)acrylate, benzyl(meth)acrylate, 1-phenylethyl(meth)acrylate, 2-phenylethyl(meth)acrylate, furfuryl(meth)acrylate, diphenylmethyl(meth)acrylate, naphthyl(meth)acrylate, pentachlorophenyl(meth)acrylate, 2-chloroethyl(meth)acrylate, methyl α-chloro(meth)acrylate, phenyl-α-bromo(meth)acrylate, trifluoroethyl(meth)acrylate, tetrafluoropropyl(meth) acrylate, polyethyleneglycol di(meth)acrylate, 1,4-butanediol di(meth)acrylate, 1,6-hexanediol di(meth)acrylate, trimethylolpropane tri(meth)acrylate, pentaerythritol tri (meth)acrylate, pentaerythritol tetra(meth)acrylate, dipentaerythritol penta(meth)acrylate, dipentaerythritol hexane (meth)acrylate, and the like; diacetone acrylamide, styrene, vinyltoluene, divinylbenzene, and the like.

It should be noted that in order to provide thermal resistance and optical characteristics to the polymerized film produced by use of the polymerizable composition of the present invention, the content of other monomers is preferably 50 parts by mass or less, especially 30 parts by mass or less per 100 parts by mass of total of the bifunctional (meth)acrylate and the monofunctional (meth)acrylate.

The above-mentioned radical polymerization initiators include, for example, benzoyl peroxide, 2,2'-azobisisobutyronitrile, benzoin ethers, benzophenones, acetophenones, benzyl ketals, diaryliodonium salts, triarylsulfonium salts, diphenyliodonium tetrafluoroborate, diphenyliodonium hexafluorophosphate, diphenyliodonium hexafluroarsenate, diphenyliodonium tetrakis(pentafluorophenyl)borate, 4-methoxyphenylphenyliodonium tetrafluoroborate, 4-methoxyphenylphenyliodonium hexafluorophosphate, 4-methoxyphenylphenyliodonium hexafluoroarsenate, bis(4-tert-butylphenyl)iodoniumdiphenyliodonium tetrafluoroborate, bis (4-tert-butylphenyl)iodoniumdiphenyliodonium hexafluoroarsenate, bis(4-tert-butylphenyl) iodoniumdiphenyliodonium trifluoromethanesulfonate, triphenylsulfonium hexafluorophosphate, triphenylsulfonium hexafluoroarsenate, triphenyl sulfonium tetrakis(pentafluorophenyl)borate, 4-methoxyphenyldiphenylsulfonium tetrafluoroborate, 4-methoxyphenyldiphenylsulfonium hexafluorophosphate, 4-methoxyphenyldiphenylsulfonium hexafluoroarsenate, 4-methoxyphenyldiphenylsulfonium trifluoromethanesulfonate, 4-methoxyphenyldiphenylsulfoniumtriphenylsulfonium tetrakis (pentafluorophenyl)borate, 4-phenylthiophenyldiphenylsulfonium tetrafluoroborate, 4-phenylthiophenyldiphenylsulfonium hexafluorophosphate, 4-phenylthiophenyldiphenylsulfonium hexafluoroarsenate, p-methoxyphenyl-2,4-bis(trichloromethyl)-s-triazine, 2-(p-butoxystyryl)-s-triazine, 2-(p-butoxystyryl)-5-trichloromethyl-1,3,4-oxadiazole, 9-phenylacridine, 9,10-dimethylbenzphenazine, benzophenone/Michler's ketone, hexaarylbiimidazole/mercaptobenzimidazole, benzyl dimethyl ketal, thioxanthone/amine, triarylsulfonium hexafluorophosphate, bis(2,4,6-trimethylbenzoyl)-phenylphosphine oxide, and the like.

In addition, a combination of the radical polymerization initiator and a sensitizer may be used preferably. Such a sensitizer includes, for example, thioxanthone, phenothiazine, chlorothioxanthone, xanthone, anthracene, diphenylanthracene, rubrene, and the like. When the radical polymerization initiator and/or the sensitizer are added, the total amount is preferably 10% by mass or less, more preferably 5% by mass or less, especially preferably in a range of 0.5 to 3% by mass, relative to polymerizable composition of the present invention.

The above-mentioned solvent includes, for example, benzene, toluene, xylene, mesitylene, n-butylbenzene, diethylbenzene, tetralin, methoxybenzene, 1,2-dimethoxybenzene, ethylene glycol dimethyl ether, diethylene glycol dimethyl ether, acetone, methyl ethyl ketone, methyl isobutyl ketone, cyclopentanone, cyclohexanone, ethyl acetate, methyl lactate, ethyl lactate, ethylene glycol monomethyl ether acetate, propylene glycol monomethyl ether acetate, propylene glycol monoethyl ether acetate, γ-butyrolactone, 2-pyrrolidone, N-methyl-2-pyrrolidone, dimethyl formamide, chloroform, dichloromethane, carbon tetrachloride, dichloroethane, trichloroethylene, tetrachloroethylene, chlorobenzene, tert-butyl alcohol, diacetone alcohol, glycerine, monoacetin, ethylene glycol, triethylene glycol, hexylene glycol, ethylene glycol monomethyl ether, ethyl cellosolve, butyl cellosolve, and the like. The solvent may be used individually or as a mixture. Among these solvents, preferable are those with boiling points in a range of 60 to 250° C., especially preferably in a range of 60 to 180° C. When the boiling point is lower than 60° C., the solvent evaporates during the coating process and, as a result, unevenness in the film thickness tends to occur. When the boiling point is higher than 250° C., there are cases where the solvent remains in the film even when vacuum is applied during a solvent evaporation process and the molecular orientation deteriorates due to occurrence of thermal polymerization during treatment at high temperature.

Further, by including an optically active compound in the polymerizable composition of the present invention, a polymer having internally a helical structure of a liquid crystal skeleton may be obtained, which can exhibit a cholesteric liquid crystal phase. When such an optically active compound is included, the amount used is preferably 0.5 to 50% by mass, more preferably 1 to 40% by mass of the polymerizable composition (without solvent, however) of the present invention. The optically active compound includes, for example, the following compounds.

[Formula 23]

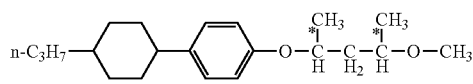

[Formula 24]

[Formula 25]

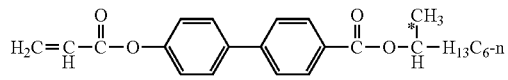

[Formula 26]

[Formula 27]

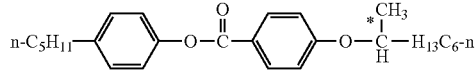

[Formula 28]

[Formula 29]

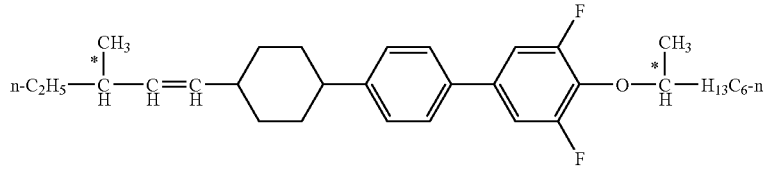

[Formula 30]

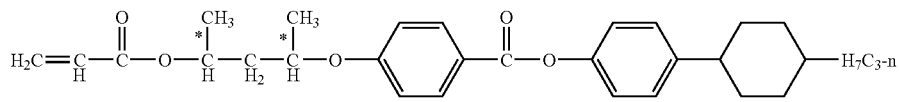

[Formula 31]

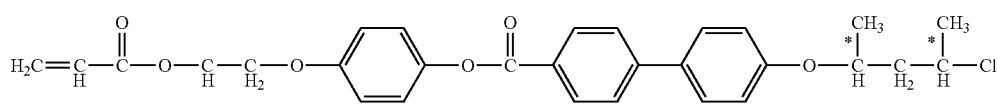

[Formula 32]

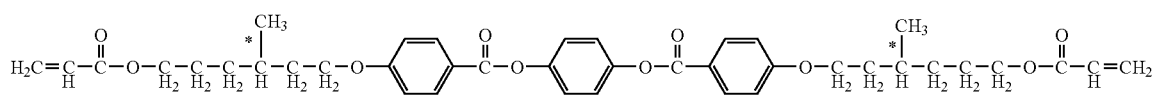

[Formula 33]

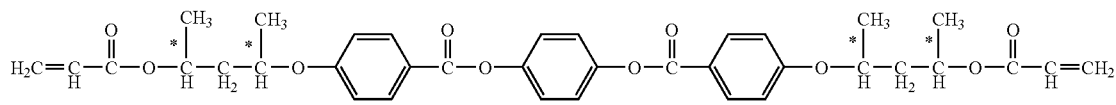

[Formula 34]

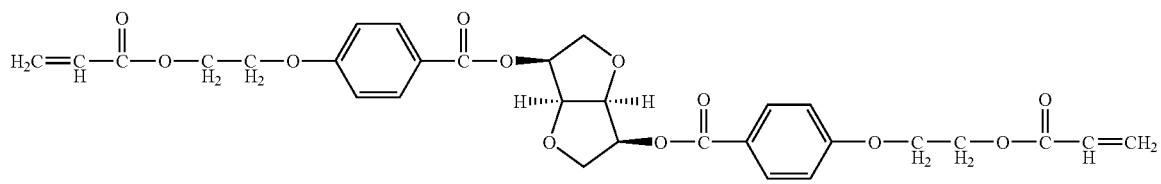

[Formula 35]

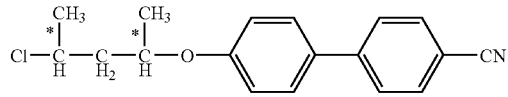

[Formula 36]

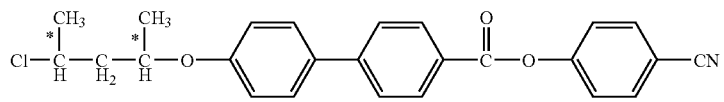

[Formula 37]

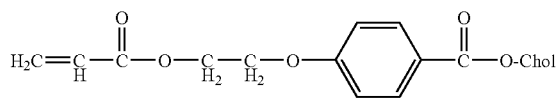

Chol is cholesteryl group shown below

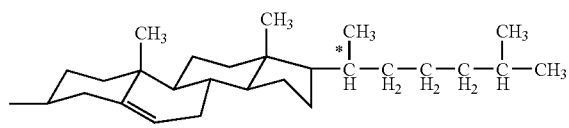

[Formula 38]

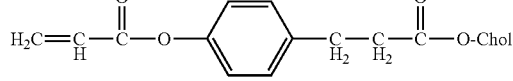

Chol is identical with that in [formula 37] shown above

[Formula 39]

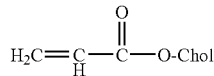

Chol is identical with that in [formula 37] shown above

[Formula 40]

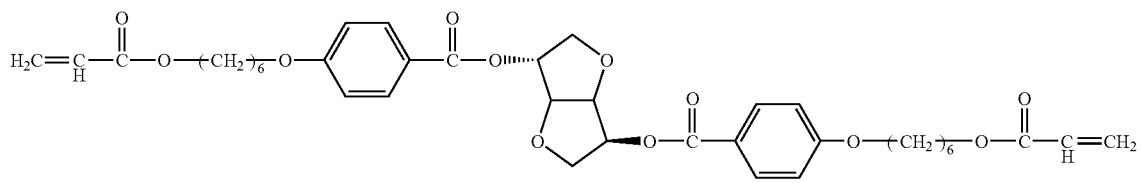

Further, in the polymerizable composition of the present invention is preferably included a surface active agent distributed on the air side of the air-composition interface and having an excluded volume effect. As the surface active agent, preferable is one which exhibits such effects as making easier the coating of the polymerizable composition on a supporting substrate and the like, and as controlling the molecular orientation of a liquid crystal phase. Such a surface active agent includes a quaternary ammonium salt, an alkylamine oxide, a polyamine derivative, a polyoxyethylene-polyoxypropylene condensate, polyethylene glycol and its ester, sodium lauryl sulfate, ammonium lauryl sulfate, an amine lauryl sulphate, an alkyl substituted aromatic sulfonic acid salt, an alkyl phosphoric acid salt, a perfluoroalkyl sulfonic acid salt, a perfluoroalkyl carboxylic acid salt, a perfluoroalkanol ethylene oxide adduct, a perfluoroalkyltrimethylammonium salt, and the like.

The proportion of the surface active agent used is, though it depends on the kind of the surface active agent or proportion of components of the composition, preferably in a range of 100 ppm to 5% by mass, especially preferably 0.05 to 1% by mass.

In addition, the polymerizable composition of the present invention may further include additives depending on necessity. As additives for adjusting characteristics of the polymerizable composition, there may be added functional compounds such as, for example, a storage stabilizer, an ultraviolet absorber, an infrared absorber, an antioxidant, inorganic and organic micro-particles, a polymer, and the like.

The above-mentioned storage stabilizer provides an effect of increasing storage stability of the liquid crystal composition. The stabilizer which may be used includes hydroquinone, hydroquinone monoalkyl ethers, tert-butylcatechol, pyrogallols, thiophenols, nitro compounds, 2-naphthylamines, 2-hydroxynaphthalenes, and the like. When these compounds are added, the amount is preferably 1% by mass or less, especially preferably 0.5% by mass or less, based on the polymerizable composition of the present invention.

The above-described antioxidant is not particularly limited and any known compound may be used. For example, hydroquinone, 2,6-di-tert-butyl-p-cresol, 2,6-di-tert-butylphenol, triphenyl phosphite, trialkyl phosphite, and the like may be cited.

The above-mentioned ultraviolet absorber is not particularly limited and any known compound may be used. For example, salicylic acid ester-type compounds, benzophenol-type compounds, benzotriazole-type compounds, cyanoacrylate-type compounds, nickel complex salt-type compounds, and the like may be mentioned.

The above-mentioned micro-particles may be used to control optical (refractive index) anisotropy (Δn) or to increase strength of the polymerized film. The material of the micro-particles includes an inorganic matter, an organic matter, metal, and the like. In order to prevent agglomeration, preferably used are the micro-particles of 0.001 to 0.1 μm diameter, more preferably those of 0.001 to 0.05 μm diameter. The particle size distribution is preferably sharp. The micro-particles may be used preferably in an amount of 0.1 to 30% by mass based on the polymerizable composition of the present invention.

The above-mentioned inorganic matter includes, for example, ceramics, fluoro bronze mica, fluoro tetrasilicate mica, taeniolite, fluoro vermiculite, fluorohectorite, hectorite, saponite, stevensite, montmorillonite, beidellite, kaolinite, flipontite, $ZnO$, $TiO_2$, $CeO_2$, $Al_2O_3$, $Fe_2O_3$, $ZrO_2$, $MgF_2$, $SiO_2$, $SrCO_3$, $Ba(OH)_2$, $Ca(OH)_2$, $Ga(OH)_3$, $Al(OH)_3$, $Mg(OH)_2$, $Zr(OH)_4$, and the like. Micro-particles such as needle crystals of calcium carbonate and the like possess optical anisotropy. By such micro-particles, the optical anisotropy of polymers may be adjusted. As the above-mentioned organic matter, for example, carbon nanotubes, fullerenes, dendrimers, polyvinyl alcohols, polymethacrylates, polyimides, and the like may be cited.

The above-mentioned polymer can control electrical properties and molecular orientation of the polymerized film, and a polymer soluble in the above-described solvents is preferably used. Such a polymer includes, for example, a polyamide, a polyurethane, a polyurea, a polyepoxide, a polyester, a polyester polyol, and the like.

The polymerized film of the present invention is obtained by, after dissolving the polymerizable composition in a solvent, coating the solution on a supporting substrate, evaporating the solvent in a state where the liquid crystal molecules contained in the polymerizable composition are oriented, and then polymerizing the composition by an energy ray irradiation.

The above-mentioned supporting substrate is not particularly limited but preferred examples include plates made of glass, polyethylene terephthalate, polycarbonate, polyimide, polyamide, polymethyl methacrylate, polystyrene, polyvinyl chloride, polytetrafluoroethylene, cellulose, and silicone, a reflector plate, a calcite plate, and the like. These support substrates provided with oriented films of polyimide or polyvinyl alcohol thereon may be used especially preferably.

A method for coating the composition on the supporting substrate includes, for example, a curtain coating method, extrusion coating method, roll coating method, spin coating method, dip coating method, bar coating method, spray coating method, slide coating method, printing coating method, flow coating method, and the like. Note that, the thickness of the polymerized film is suitably selected depending on areas of application and the like, but is preferably selected from a range of 0.05 to 10 μm.

A method for orienting the liquid crystal molecules contained in the polymerizable composition includes, for example, having the supporting substrate subjected to an orientation treatment in advance. A preferable method to perform an orientation treatment includes forming a liquid crystal oriented layer consisting of oriented films of various polyimides or polyvinyl alcohols on the supporting substrate and carrying out the treatment such as rubbing and the like. In addition, methods such as applying a magnetic field, an electric field, and the like to the composition placed on the supporting substrate may be mentioned.

The method for polymerizing the polymerizable composition of the present invention includes publicly known methods which use heat or an electromagnetic wave. Polymerization reactions induced by an electromagnetic wave includes radical polymerization, anionic polymerization, cationic polymerization, coordination polymerization, living polymerization, and the like. Among these, preferable is the radical polymerization which is carried out by irradiating light in the presence of the above-mentioned polymerization initiators. When properties of the polymerizable groups are considered, a preferable reaction is the cationic polymerization. Further, in order to obtain a polymerized film having excellent molecular orientation, the cationic polymerization induced by irradiation of light is preferable. This is so because the cationic polymerization is easily carried out under a condition where the polymerizable composition exhibits a liquid crystal phase. It is also preferable to crosslink under application of a magnetic field or an electric field. The liquid crystal (co)polymer formed on the supporting substrate may be used as it is or, according to necessity, it may be used after being peeled off from the substrate or being transferred to other supporting substrates.

A preferable example of the above-mentioned light includes ultraviolet light, visible light, infrared light, and the like. The electromagnetic wave such as an electron beam, an X ray, and the like may also be used. Usually, ultraviolet light or visible light is preferable. The range of wavelength is preferably 150 to 500 nm, more preferably 250 to 450 nm, and most preferably 300 to 400 nm. As light sources a low-pressure mercury vapor lamp (a bactericidal lamp, a fluorescent chemical lamp, or a black light), a high-pressure discharge lamp (a high-pressure mercury lamp, or a metal halide lamp), a short arc discharge lamp (an extra high-pressure mercury lamp, a xenon lamp, or a mercury xenon lamp), or the like can be mentioned. Among these, the extra high-pressure mercury lamp may be used preferably. The light emitted from the light source may be irradiated directly on the composition, or a specific wavelength (or a specific range of wavelengths) selected by means of a filter may be irradiated on the composition. Preferable irradiation energy density is 2 to 5000 $mJ/cm^2$, more preferably 10 to 3000 $mJ/cm^2$, especially preferably 100 to 2000 $mJ/cm^2$. Preferable illumination intensity is 0.1 to 5000 $mW/cm^2$, more preferably 1 to 2000 $mW/cm^2$. The temperature at which the composition is irradiated by light may be set so that the composition exhibits a liquid crystal phase, but a preferable irradiation temperature is 100° C. or lower. At a temperature higher than 100° C., thermal polymerization may take place and, as a result, there may be a case in which good molecular orientation is not obtained.

The polymerized film of the present invention may be used as a shaped material having optical anisotropy. Application of this shaped material includes, for example, an optical compensation use such as a retardation plate (a half wavelength plate, a quarter wavelength plate, and the like), a polarizing element, a dichroic polarizing plate, a liquid crystal orientation film, an antireflection film, a selective reflection film, and a viewing angle compensation film, and the like. Additionally, it may be used as an optical lens such as a liquid crystal lens, a microlens, and the like, and as an information recording material such as PDLC-type electronic paper, digital paper, and the like.

EXAMPLES

In the following, the present invention will be described in further detail in terms of Examples. However, the present invention is not limited in any way by these Examples and the like.

Manufacturing Example 1

First, a polymerized film was produced from the polymerizable composition of the present invention according to the following procedures (1. Preparation of a polymerizable composition solution, 2. Production of a supporting substrate, 3. Coating on the supporting substrate).

1. Preparation of a Polymerizable Composition Solution

After adding and dissolving 1.0 g of a composition listed in Table 1 in 4 g of a solvent (cyclohexanone/2-butanone=1/1 (mass %)), 0.03 g of a radical polymerization initiator (N-1919, produced by ADEKA Corporation) was added. After complete dissolution of the initiator, the composition solution was filtered through a 0.1 μm filter.

2. Production of a Supporting Substrate

On a glass plate which was washed with a neutral detergent, rinsed with pure water, and dried, a 5% aqueous solution of polyvinyl alcohol was coated uniformly by a spin coater. After drying at 100° C. for 3 minutes, the surface of the polyvinyl alcohol film supported on the glass plate was rubbed unidirectionally with a rayon cloth and, thus, was produced a supporting substrate to be coated.

3. Coating on the Supporting Substrate

The solution prepared in Procedure 1 was uniformly coated on the supporting substrate produced in Procedure 2 by a spin coater. After drying at 100° C. for 3 minutes using a hot plate, the film was cooled at room temperature for 3 minutes, and cured by irradiation by a high pressure mercury lamp (120 W/cm²) for 20 seconds to obtain a polymerized film.

Example 1-1 to 1-3, Comparative Example 1-1 to 1-7

The polymerized film obtained according to the above-mentioned method was subjected to the following tests. The results of these tests are collectively shown in Table 1.

1. Retardation (R)

Retardation (R) of the polymerized film obtained by the above method was measured using a polarizing microscope at a wavelength of 546 nm and at 25° C. according to a birefringence measurement method based on the Senarmont technique.

2. Film Thickness (d)

Thickness (d) of the polymerized film obtained was measured by a needle type surface roughness tester (Dektak6M; produced by Ulvac Inc.) at room temperature, 25° C.

3. Optical (Refractive Index) Anisotropy (Δn)

The optical (refractive index) anisotropy (Δn) of the polymerizable composition and that of the polymerized film obtained by polymerizing the composition were obtained by the following methods.

The optical (refractive index) anisotropy (Δn) of the polymerizable composition was calculated by extrapolating a physical property of a composition which is prepared by adding 10% by mass of the polymerizable composition to an ester-type nematic liquid crystal having an optical (refractive index) anisotropy (Δn) of 0.0979 at a wavelength of 589 nm at room temperature, 25° C. On the other hand, the optical (refractive index) anisotropy (Δn) of the polymerized film was calculated by substituting the values of retardation (R) and film thickness (d) obtained above into the following relational expression.

Optical (refractive index) anisotropy (Δ$n$)=retardation ($R$)/film thickness ($d$)

In addition, as the above-mentioned ester-type nematic liquid crystal, a composition based on a 4-n-alkylcyclohexane carboxylic acid alkoxyphenyl ester was used, the formulation being shown in the following [Formula 41].

[Formula 41]

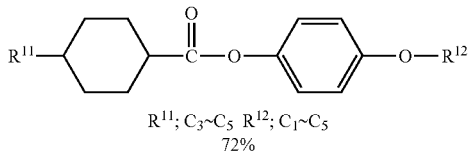

$R^{11}$; $C_3$~$C_5$  $R^{12}$; $C_1$~$C_5$
72%

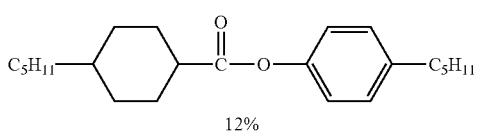

12%

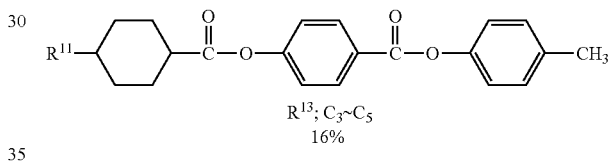

$R^{13}$; $C_3$~$C_5$
16%

4. Uniformity

Uniformity of the polymerized film was evaluated by use of a polarizing microscope. By rotating the stage with a specimen of the polymerized film disposed thereon under a cross-Nicol condition, the state of molecular orientation of the polymerized film was observed and uniformity of the film was evaluated. The results are expressed as follows. When uniform orientation of the polymerized film was obtained, the result is expressed by a circle, ○. When orientation was obtained but was not uniform, the result is expressed by a triangle, Δ. And, when no orientation was obtained at all because of growth of crystals in the polymerized film and the like, the result is expressed by a cross, X.

Example 2-1, Comparative Example 2-1

Next, after adding and dissolving 1.0 g of a composition listed in Table 2 in 4 g of a solvent (methyl ethyl ketone), 0.0025 g of a radical polymerization initiator (N-1919; produced by ADEKA Corporation) was added. After complete dissolution of the initiator, the composition solution was filtered through a 0.1 μm filter. On the supporting substrate prepared in the Manufacturing Example 1, the solution was coated uniformly by a spin coater. After drying at 100° C. for 3 minutes using a hot-plate, the film was cooled at room temperature for 1 minute, and cured by irradiation by a high pressure mercury lamp (120 W/cm²) for 20 seconds to obtain a polymerized film. The film obtained was subjected to evaluation of selective reflection and film uniformity. These results are collectively shown in Table 2.

TABLE 1

|  | Example | | | Comparative Example | | | | | | |
|---|---|---|---|---|---|---|---|---|---|---|
|  | 1-1 | 1-2 | 1-3 | 1-1 | 1-2 | 1-3 | 1-4 | 1-5 | 1-6 | 1-7 |
| Composition (% by mass) Bifunctional (meth)acrylate compound | | | | | | | | | | |
| Compound. No. 1 | 80 | 80 |  | 100 |  |  |  | 80 | 80 |  |
| Compound. No. 3 |  |  | 80 |  | 100 |  |  |  |  |  |
| Comparative Compound No. 1*1 |  |  |  |  |  | 100 |  |  |  | 80 |
| Monofunctional (meth)acrylate compound | | | | | | | | | | |
| Compound a | 20 |  | 20 |  |  |  |  |  |  | 20 |
| Compound b |  | 20 |  |  |  |  |  |  |  |  |
| Comparative Compound 2*2 |  |  |  |  |  |  | 20 |  |  |  |
| Comparative Compound 3*3 |  |  |  |  |  |  |  | 20 |  |  |
| Comparative Compound 4*4 |  |  |  |  |  |  |  |  | 20 |  |
| Physical property | | | | | | | | | | |
| Retardation (R) (nm) | 202 | 212 | 267 | 179 | 273 | — | — | 182 | 231 | 170 |
| Film thickness (d) (μm) | 1.15 | 1.25 | 1.05 | 1.1 | 1.1 | — | — | 1.25 | 1.1 | 1.15 |
| Optical (refractive index) anisotropy (Δn) (Composition) | 0.21 | 0.201 | 0.236 | 0.216 | 0.245 | 0.17 | — | 0.2 | 0.226 | 0.198 |
| Optical (refractive index) anisotropy (Δn) (Polymerized film) | 0.176 | 0.17 | 0.254 | 0.163 | 0.248 | — | — | 0.146 | 0.21 | 0.148 |
| Uniformity of film | ○ | ○ | ○ | ○ | Δ | X Precipitation of crystals | X Precipitation of crystals | ○ | Δ*5 | Δ*6 |

*1 Comparative compound 1

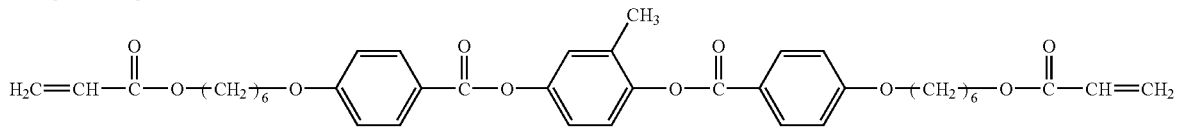

*2 Comparative compound 2

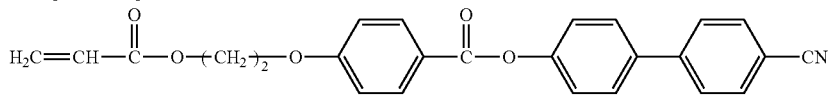

*3 Comparative compound 3

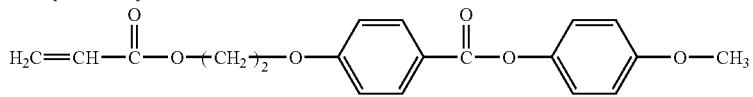

*4 Comparative compound 4

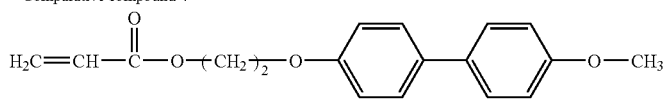

*5 Uniformity of the film of Comparative Example 1-6: disorder in orientation was present.
*6 Uniformity of the film of Comparative Example 1-7: disorder in orientation was present. Precipitation of crystals was observed in part of the film

TABLE 2

|  | Example 2-1 | Comparative Example 2-1 |
|---|---|---|
| Composition (% by mass) | | |
| <Bifunctional (meth)acrylate compound> | 60 | 60 |
| Compound No. 3 | | |
| <Monofunctional (meth)acrylate compound> | | |
| Compound No. a | 15 |  |
| Comparative compound 3 *3 |  | 15 |
| Optically active compound *7 | 25 | 25 |
| Physical property | | |
| Selective reflection | ○ (Red) | X |
| λmax (nm) | 603.5 | — |
| Uniformity of film | ○ | Δ |

*7 Optically active compound

From Table 1, it is clear that the polymerized films of Comparative Examples 1-1 to 1-7, which are not of composition of the present invention, are unsatisfactory in that they lack uniformity of the films, show precipitation of crystals, and have small optical (refractive index) anisotropy (Δn) values. In contrast, from the results of Examples 1-1 to 1-3, it is clear that the polymerized films of the composition of the present invention give polymerized films which show excellent performance in control of molecular orientation and optical (refractive index) anisotropy (Δn). Especially, while, in Comparative Example 1-7, the polymerized film produced from a composition which is not that of the present invention showed a large decrease in Δn, the polymerized film in Example 1-3, produced from the composition of the present film, showed further increase in Δn. Thus, it is clear that the unique effect of the polymerized film of the present invention is obtained only by a combination of specific liquid crystal compounds.

In addition, Table 2 shows that, in Comparative Example 2-1, the polymerized film could not provide uniform molecular orientation, so that its optical characteristics were inferior and visual observation of the polymerized film showed no specific color due to selective reflection. In contrast, the polymerized film of Example 2-1 showed a good molecular orientation, and was confirmed to provide red-colored selective reflection, and excellent optical properties. Therefore, it is clear that, by including an optically active compound in the composition of the present invention, the resultant composition can be used suitably as a material for producing a cholesteric liquid crystal film. Further, the polymerized film of the present invention can be used suitably for optical films for displays.

INDUSTRIAL APPLICABILITY

The polymerizable composition of the present invention can be polymerized in a liquid crystal state at around room temperature and has excellent solubility in organic solvent and heat resistance. The polymerized film of the present invention obtained by photo-polymerizing the composition maintains a uniform film state and is useful as a liquid crystal material with excellent optical characteristics.

The invention claimed is:

1. A polymerizable composition comprising a bifunctional (meth)acrylate compound represented by the following general formula (1) and a monofunctional (meth)acrylate compound represented by the general formula (2):

[Formula 1]

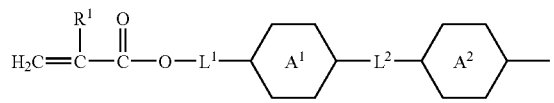
(1)

[Formula 3]

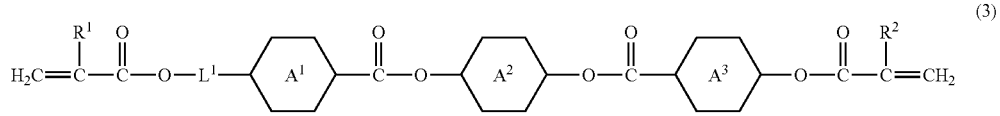
(3)

-continued

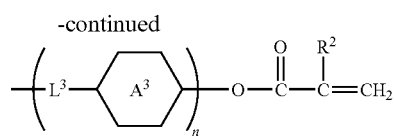

wherein $R^1$ and $R^2$ each independently represent a hydrogen atom, a methyl group, or a halogen atom; rings $A^1$, $A^2$, and $A^3$ each independently represent a benzene ring, a cyclohexane ring, a cyclohexene ring, a naphthalene ring, a decahydronaphthalene ring, a tetrahydronaphthalene ring, or a phenanthrene ring; these rings may be substituted with an alkyl group having 1 to 8 carbon atoms, an alkoxy group having 1 to 8 carbon atoms, a halogen atom, or a cyano group; al least one of the rings $A^1$, $A^2$, and $A^3$ comprises a substituent; —CH= in these rings may be replaced by —N=, and —CH$_2$— in these rings may be replaced by —S— or —O—: $L^1$, $L^2$, and $L^3$ each independently represent —COO—, —OCO—, —(CH$_2$)$_p$—, —CH=CH—, —(CH$_2$)$_q$O—, —CH=CHCH$_2$O—, —C≡C—, —(CH$_2$)$_2$COO—, or —CF=CF—; n represents an integer from 0 to 3; and, when n is 2 or larger, $L^3$ and $A^3$ may be the same or different; p and q each independently represent an integer from 1 to 8:

[Formula 2]

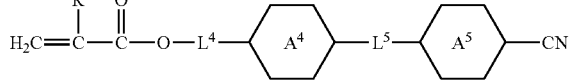
(2)

wherein $R^1$ represents a hydrogen atom, a methyl group, or a halogen atom; rings $A^4$ and $A^5$ each independently represent a benzene ring, a cyclohexane ring, a cyclohexene ring, a naphthalene ring, a decahydronaphthalene ring, a tetrahydronaphthalene ring, or an anthracene ring; these rings may be substituted with an alkyl group having 1 to 8 carbon atoms, an alkoxy group having 1 to 8 carbon atoms, a halogen atom, or a cyano group; —CH= in these rings may be replaced by —N=, and —CH$_2$— in these rings may be replaced by —S— or —O—; $L^4$ and $L^5$ each independently represent a single bond, —COO—, —(CH$_2$)$_p$—, —CH=CH—, —(CH$_2$)$_q$O—, —CH=CHCH$_2$O—, —C≡C—, —(CH$_2$)$_2$COO—, or —CF=CF—; p and q each independently represent an integer from 1 to 8.

2. The polymerizable composition according to claim 1, wherein the bifunctional (meth)acrylate compound represented by the general formula (1) is a compound represented by the following general formula (3):

wherein $R^1$, $R^2$, rings $A^1$, $A^2$, and $A^3$, and $L^1$ are the same as those defined in the general formula (1).

3. The polymerizable composition according to claim 1, wherein the monofunctional (meth)acrylate compound represented by the general formula (2) is a compound represented by the following general formula (4);

[Formula 4]

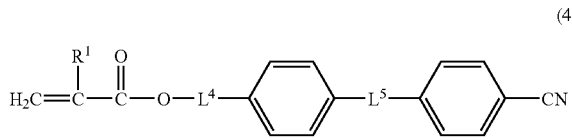

(4)

wherein $R^1$, $L^4$, and $L^5$ are the same as those defined in the general formula (2).

4. The polymerizable composition according to claim 1, wherein at least one of the rings $A^1$, $A^2$ and $A^3$ in the general formula (1) is a naphthalene ring.

5. The polymerizable composition according to claim 1, wherein a proportion (mass ratio) of the monofunctional (meth)acrylate compound represented by the general formula (2) to the bifunctional (meth)acrylate compound represented by the general formula (1) is in a range of 20/80 to 95/5.

6. The polymerizable composition according to claim 1, which exhibits a liquid crystal phase at a temperature of 30° C. or lower.

7. The polymerizable composition according to claim 1, which further comprises an optically active compound and exhibits a cholesteric phase.

8. The polymerizable composition according to claim 7, which further comprises a radical polymerization initiator and a surface active agent.

9. A polymerized film produced by photopolymerizing the composition according to claim 1, wherein the composition is in a state to exhibit a liquid crystal phase 10. An optical film for displays, comprising using the polymerized film according to claim 9.

11. The polymerizable composition according to claim 2, wherein the monofunctional (meth)acrylate compound represented by the general formula (2) is a compound represented by the following general formula (4);

[Formula 4]

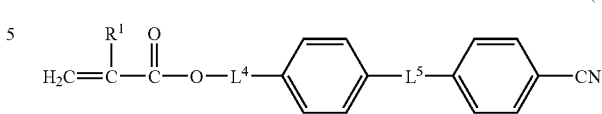

(4)

wherein $R^1$, $L^4$, and $L^5$ are the same as those defined in the general formula (2).

12. The polymerizable composition according to claim 2, wherein at least one of the rings $A^1$, $A^2$, and $A^3$ in the general formula (1) is a naphthalene ring.

13. The polymerizable composition according to claim 3, wherein at least one of the rings $A^1$, $A^2$, and $A^3$ in the general formula (1) is a naphthalene ring.

14. The polymerizable composition according to claim 2, wherein a proportion (mass ratio) of the monofunctional (meth)acrylate compound represented by the general formula (2) to the bifunctional (meth)acrylate compound represented by the general formula (1) is in a range of 20/80 to 95/5.

15. The polymerizable composition according to claim 3, wherein a proportion (mass ratio) of the monofunctional (meth)acrylate compound represented by the general formula (2) to the bifunctional (meth)acrylate compound represented by the general formula (1) is in a range of 20/80 to 95/5.

16. The polymerizable composition according to claim 4, wherein a proportion (mass ratio) of the monofunctional (meth)acrylate compound represented by the general formula (2) to the bifunctional (meth)acrylate compound represented by the general formula (1) is in a range of 20/80 to 95/5.

17. The polymerizable composition according to claim 2, which exhibits a liquid crystal phase at a temperature of 30° C. or lower.

18. The polymerizable composition according to claim 3, which exhibits a liquid crystal phase at a temperature of 30° C. or lower.

19. The polymerizable composition according to claim 4, which exhibits a liquid crystal phase at a temperature of 30° C. or lower.

20. The polymerizable composition according to claim 5, which exhibits a liquid crystal phase at a temperature of 30° C. or lower.

* * * * *